United States Patent
Cariello

(10) Patent No.: US 12,216,572 B2
(45) Date of Patent: Feb. 4, 2025

(54) ATOMIC WRITE OPERATIONS

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/591,942

(22) Filed: Feb. 29, 2024

(65) Prior Publication Data

US 2024/0281367 A1    Aug. 22, 2024

Related U.S. Application Data

(63) Continuation of application No. 17/663,125, filed on May 12, 2022, now Pat. No. 11,934,303.

(51) Int. Cl.
*G06F 12/00* (2006.01)
*G06F 12/02* (2006.01)

(52) U.S. Cl.
CPC .. *G06F 12/0238* (2013.01); *G06F 2212/7201* (2013.01)

(58) Field of Classification Search
CPC ......... G06F 12/0238; G06F 2212/7201; G06F 2221/0795; G06F 3/0659
See application file for complete search history.

(56) References Cited

U.S. PATENT DOCUMENTS

| | | | |
|---|---|---|---|
| 9,128,699 B2 * | 9/2015 | Royer | G06F 3/061 |
| 2013/0332660 A1 * | 12/2013 | Talagala | G06F 12/08 |
| | | | 711/103 |
| 2016/0350003 A1 * | 12/2016 | Kanno | G06F 3/0656 |

\* cited by examiner

*Primary Examiner* — Shawn X Gu
(74) *Attorney, Agent, or Firm* — Holland & Hart LLP

(57) ABSTRACT

Methods, systems, and devices for atomic write operations are described. A host system may receive a sequence of data that includes a first set of data and a second set of data. The host system may determine, based on the sequence of data, a first set of contiguous logical addresses for the first set of data and a second set of contiguous logical address for the second set of data. The host system may then transmit to a memory system a write command that indicates the first set of contiguous logical addresses and the second set of contiguous logical addresses. The first set of contiguous logical addresses may be discontiguous with the second set of contiguous logical addresses.

20 Claims, 9 Drawing Sheets

ATOMIC WRITE OPERATIONS

CROSS REFERENCE

The present application for patent is a continuation of U.S. patent application Ser. No. 17/663,125 by Cariello et al., entitled "ATOMIC WRITE OPERATIONS," filed May 12, 2022, assigned to the assignee hereof, and is expressly incorporated by reference in its entirety herein.

FIELD OF TECHNOLOGY

The following relates to one or more systems for memory, including atomic write operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A host system may include a driver that the host system uses to transmit information to a memory system for storage (e.g., for storage in a non-volatile memory of the memory system). For example, the host system may receive a data sequence from an application or component of the host system, and relay that data sequence, via the driver, to the memory system for storage. If the data sequence is sufficiently large, the host system may transmit the data sequence in sets of data. Upon receipt of a set of data, the memory system may buffer (e.g., store in a local memory such as a volatile memory) the set of data until the memory system is ready to copy the set of data to the non-volatile memory. If, however, the memory system experiences a failure event (e.g., a power loss) before copying the entire data sequence to the non-volatile memory, the memory system may not only lose a portion of the data sequence but may also need to rebuild information about data safely stored into the non-volatile memory, which may negatively impact performance and require additional remedial actions.

According to the techniques described herein, a system may implement an atomic write operation to ensure that a sequence of data is treated as one indivisible unit (e.g., is not partially written to memory and thus partially lost during an adverse event, such as a failure event). In a first example, a host system may use a multi-range write command that allows the memory system to determine the sets of data included in a data sequence for the atomic write operation. A multi-range write command may refer to a write command that indicates multiple discontiguous ranges of logical addresses for a sequence of data. In a second example, the host system may instruct or request the memory system to enter a mode for receiving a sequence of data for an atomic write operation. The host system may then use an identifier for the mode (or other value associated with the mode) to flag write commands for sets of data that are included in the sequence of data.

If a set of data is included in the data sequence for an atomic write operation, the memory system may store information, such as metadata, for the set of data that indicates the atomicity of the set of data, where the atomicity may refer to the inclusion of the set of data in the data sequence for the atomic write operation. The memory system may store the information, such as the metadata, in the non-volatile memory (e.g., together with the associated set of data) so that that metadata can be used after an adverse event, such as a failure event, to determine the status of the sequence of data (e.g., whether the sequence of data was partially or entirely saved to the non-volatile memory) and, potentially, to enable remedial action by the memory system if the sequence of data was only partially saved.

Figure 1:
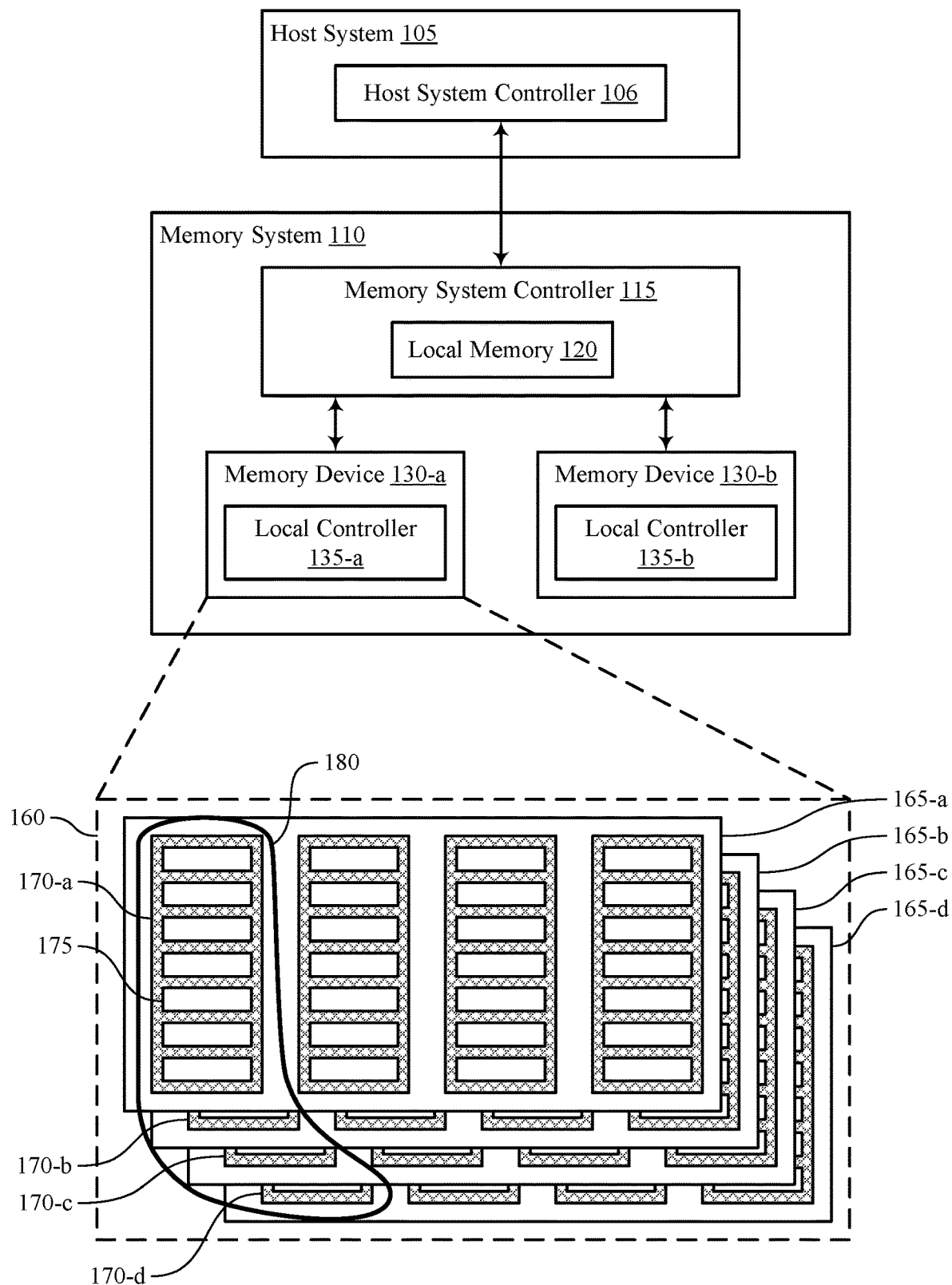
FIG. 1 illustrates an example of a system that supports atomic write operations in accordance with examples as disclosed herein.
Figure 2:
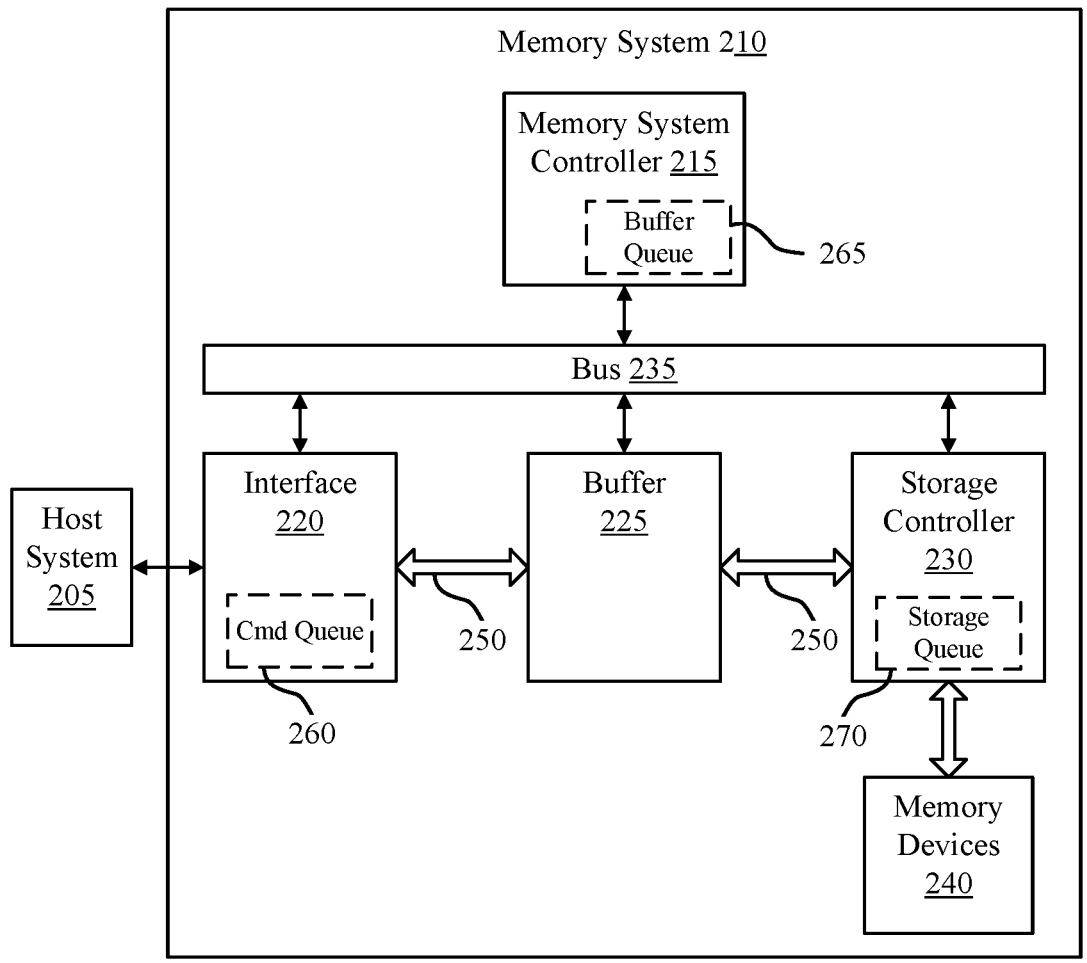
FIG. 2 illustrates an example of a system that supports atomic write operations in accordance with examples as disclosed herein.

Features of the disclosure are initially described in the context of systems, devices, and circuits with reference to FIGS. 1 through 2. Features of the disclosure are described in the context of process flows with reference to FIGS. 3 and 4. These and other features of the disclosure are further illustrated by and described in the context of an apparatus diagram and flowchart that relate to atomic write operations with reference to FIGS. 5-9.

FIG. 1 illustrates an example of a system 100 that supports atomic write operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support atomic write operations. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

The system 100 may include any quantity of non-transitory computer readable media that support techniques for atomic write operations. For example, the host system 105, the memory system controller 115, or a memory device 130 (e.g., a local controller 135) may include or otherwise may access one or more non-transitory computer readable media storing instructions (e.g., firmware) for performing the functions described herein to the host system 105, memory system controller 115, or memory device 130 (or any combination thereof). For example, such instructions, if executed by the host system 105 (e.g., by the host system controller 106), by the memory system controller 115, or by a memory device 130 (e.g., by a local controller 135), may cause the host system 105, memory system controller 115, or memory device 130 (or any combination thereof) to perform one or more associated functions as described herein.

In some examples, the memory system 110 may receive sets of data that, collectively, make up a sequence of data. The memory system 110 may buffer the received sets of data (e.g., in the local memory 120) before writing the sets of data in memory, such as non-volatile memory (e.g., one or more of the memory devices 130), for long-term storage. The term "buffer" may refer to the act of temporarily storing data or to the storage medium used to temporarily store data. The storage medium used to temporarily store data may also be referred to as a cache, a local memory, or other suitable terminology.

But in some examples, the memory system 110 may experience an adverse event, such as a failure event (e.g., a power loss, a system reset) that destroys one or more of the sets of data in the local memory 120 before the sets of data can be written, for example, to the non-volatile memory. In such a scenario, only a portion of the sequence of data may be preserved in the non-volatile memory, which may negatively impact the performance of the system 100. For some sequences of data (e.g., database files), it may be advantageous for the system 100 to detect whether the entire sequence of data is written to non-volatile memory (as opposed to the sequence of data being partially written to non-volatile memory) so that the system 100 can take appropriate remedial action, such as discarding a sequence of data that has only been partially written.

According to the techniques described herein, the system 100 may implement an atomic write operation to detect if a sequence of data has only been partially written (e.g., due to a failure event).

In a first example, the host system 105 may use a multi-range write command with header information that indicates multiple ranges of logical addresses (e.g., LBAs) for sets of data that are included the sequence of data. The logical addresses in a range may be contiguous (e.g., numerically sequential), but the ranges may be discontiguous (e.g., the starting and ending logical addresses for each range may be numerically non-sequential with the starting and ending logical addresses of other ranges). The starting address for a range may refer to the numerically first logical address in the range and the ending logical address may refer to the numerically last logical address in the range. The memory system 110 may use the header information included in the multi-range write command to identify sets of data that are included in a sequence of data for an atomic write operation. If a set of data is included in the sequence of data, the memory system 110 may write to the non-volatile memory information, such as metadata, for the set of data (e.g., together with the set of data) that indicates the set of data is included in the sequence of data. If a failure event occurs, the memory system 110 may use the metadata to determine whether the entire sequence of data was stored in non-volatile memory (and potentially to perform remedial actions in event the sequence of data is determined to be only partially stored).

In a second example, the host system 105 may instruct the memory system 110 to enter a mode, which may be referred to as an atomic mode, for receiving a sequence of data for an atomic write operation. Instructing the memory system 110 to enter the atomic mode may also be referred to as opening a context, whereas instructing the memory system 110 to exit the atomic mode may be referred to as closing the context. The atomic mode may have an associated value (e.g., a mode identifier) that the host system 105 uses to indicate write commands that are for the sequence of data. For example, the host system 105 may include a group identifier in one or more write commands (e.g., each write command) for the sequence of data. The group identifier may be equal to the value associated with the atomic mode so that the memory system 110 can identify sets of data that are included in a sequence of data for an atomic write operation. More contexts can be opened during the same time with different associated group identifiers. If a set of data is included in the sequence of data, the memory system 110 may write to the non-volatile memory metadata for the set of data (e.g., together with the set of data) that indicates the set of data is included in that atomic sequence of data. If a failure event occurs, the memory system 110 may use the metadata to determine whether the entire sequence of data was stored in non-volatile memory (and potentially to perform remedial actions in event the sequence of data is determined to be only partially stored).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

FIG. 2 illustrates an example of a system 200 that supports atomic write operations in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In some examples, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on (e.g., in response to) the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270, among other options, the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated based on (e.g., by) the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system 210 may operate the buffer 225, or another local memory such as a volatile memory, as a buffer for a non-volatile memory included in one or more of the memory devices 240. For example, upon receipt of a set of data from the host system 205, the memory system 210 may write the set of data to the buffer 225. If the buffer 225 reaches capacity, or if another trigger is detected, the memory system 210 may copy the data from the buffer 225 to the non-volatile memory, which may be referred to as "flushing" the data. For example, the buffer 225 may read the data from the buffer 225 and write the data, which may include various sets of data for the sequence of data, to the non-volatile memory. For each set of data included in the sequence of data the memory system 210 may also write information, such as atomic metadata (e.g., to the non-volatile memory), that indicates the atomicity of the set of data. That is, if a set of data is identified as being part of a sequence of data for an atomic write operation (e.g., based on a multi-range write command or an atomic mode identifier), the memory system 210 may write metadata for the set of data, which may be referred to as atomic metadata, that indicates the set of data is included in the sequence of data.

Depending on the size of the sequence of data and the timing of flushing, it is possible that only a portion of a sequence of data may be written to the non-volatile memory. If the memory system 210 experiences a failure event, the memory system 210 may use the information, for example atomic metadata, stored in the non-volatile memory to determine whether only a portion of the sequence of data was written to the non-volatile memory, and, if so, may take appropriate remedial action. For example, the memory system 210 may discard the portion of the sequence of data that was written to the non-volatile memory and revert associated information tables (e.g., L2P tables, validity tables), among other actions. As an example, the memory system might write in the metadata associated with each logical address the group identifier of the atomic sequence, in order to identify all the data belonging to the atomic sequence, and a flag on the last flushed logical address to indicate the end of the sequence. Since the chronological layout order of data in the non-volatile memory is known, if during recovery one codeword (e.g., atomic set of data) is missing before the end of atomic sequence or end of the atomic sequence is missing, all the data belonging to the atomic sequence will be discarded.

Figure 3:
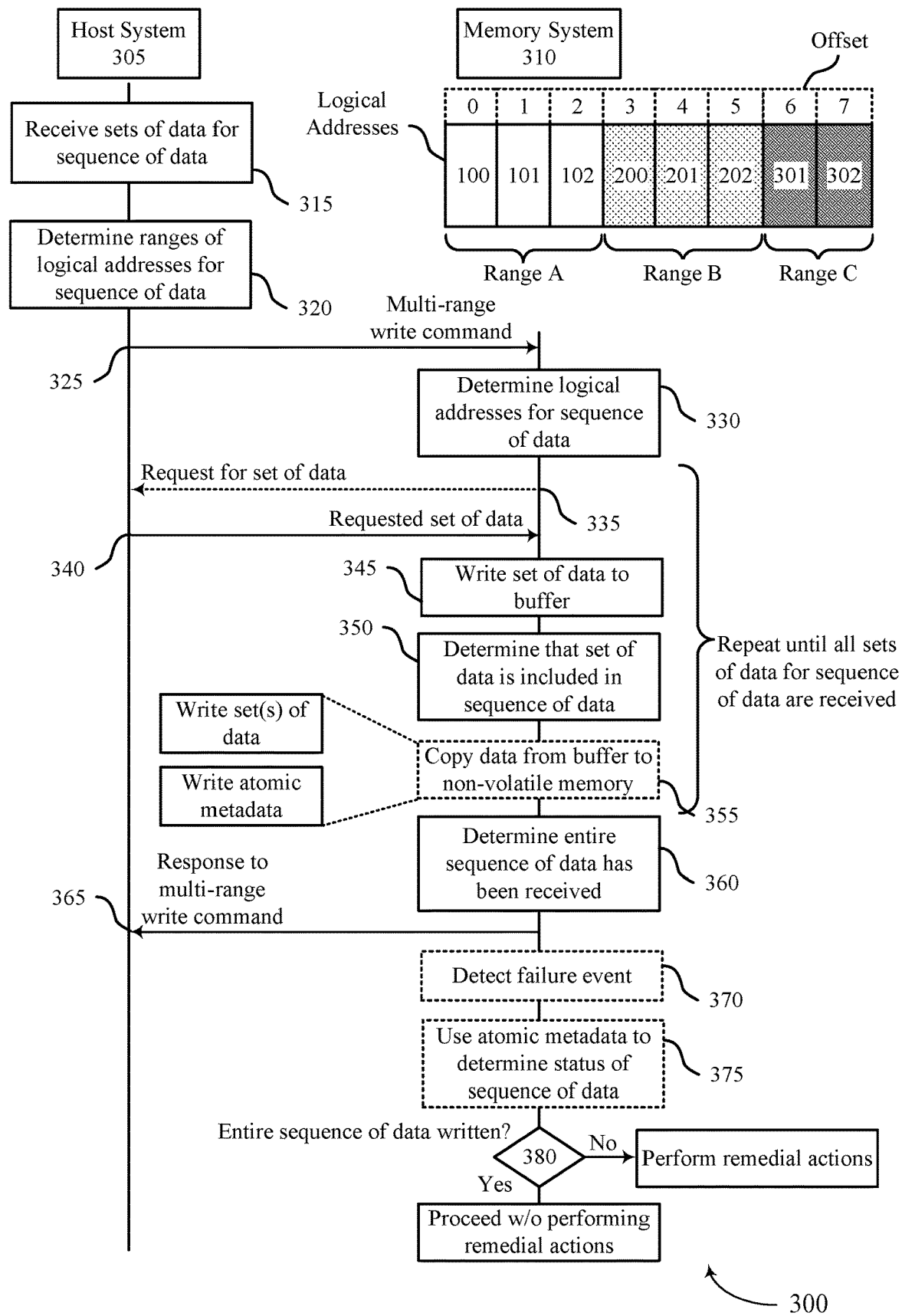
FIG. 3 illustrates an example of a process flow that supports atomic write operations in accordance with examples as disclosed herein.

FIG. 3 illustrates an example of a process flow 300 that supports atomic write operations in accordance with examples as disclosed herein. The process flow 300 may be implemented by a host system 305 and a memory system 310 (among other examples), which may be examples of a host system and a memory system described herein. Although various signals are shown being exchanged directly between the host system 305 and the memory system 310, it should be appreciated that signals may be relayed between the host system 305 and the memory system 310 by or through one or more intermediary devices. In general, a signal sent from system A to system B may refer to a signal that originates at system A and terminates at system B, regardless of any intermediate devices used to relay, adapt and transmit, or modify and transmit the signal. In process flow 300, the host system 305 and the memory system 310 may use a multi-range write command to implement an atomic write operation.

Aspects of the process flow 300 may be implemented by one or more controllers, among other components. Additionally or alternatively, aspects of the process flow 300 may be implemented as instructions stored in memory (e.g., firmware stored in a memory coupled with one or both of the host system 305 or the memory system 310). For example, the instructions, if executed by a controller (e.g., the host system controller 106, the memory system controller 115, a local controller 135), may cause the controller to perform the operations of the process flow 300.

At 315, the host system 305 may receive (e.g., at a driver) sets of data (e.g., from an application or component of the host system 305) that are included in a sequence of data. The host system 305 may receive the sets of data serially (e.g., one at a time) or in parallel (e.g., at wholly or partially overlapping times). The sets of data may be flagged or otherwise indicated as being linked together for storage. The host system 305 may accumulate (e.g., store) the sets of data in a buffer at the host system 305.

At 320, the host system 305 may determine a range of logical addresses for each set of data. For example, if the sequence of data includes three sets of data, the host system 305 may determine a first range (e.g., range A) of logical addresses for the first set of data, a second range (e.g., range B) of logical addresses for the second set of data, and a third range (e.g., range C) of logical addresses for the third set of data. Each range of logical addresses may be a set of contiguous logical addresses (e.g., range A may include contiguous logical addresses 100 through 102, range B may include contiguous logical addresses 200 through 202, and range C may include contiguous logical addresses 301 and 302). However, the ranges may be discontiguous with respect to each other. In some examples, each logical address may be associated with a respective offset in the buffer. Additionally, each range of logical addresses may be a same size (e.g., have a same quantity of logical addresses), or may be a different size (e.g., have a different quantity of logical addresses), or some combination thereof.

At 325, the host system 305 may transmit a multi-range write command to the memory system 310. In some examples, the host system 305 may delay transmitting the multi-range write command until the host system 305 has determined that the last set of data for the sequence of data has been received (so that the multi-range command can account for all the sets of data in the sequence of data). The multi-range write command may indicate the multiple discontiguous ranges logical addresses associated with the sequence of data. For example, the multi-range write command may include information that indicates range A, range B, and range C, such as a header with header information that indicates range A, range B, and range C. The header may comprise a quantity of control bits.

In a first example, the header information may include an indication of the respective starting logical address for each range (e.g., 100, 200, 301) and the respective length of each range (e.g., 3, 3, 2), where the length of a range is the quantity of logical addresses in that range. In the first example, the header information may also indicate the quantity or ranges (e.g., three) indicated by the multi-range write command. Relative to other techniques, the first example, may be less complex and reduce processing. Table 1 illustrates header information according to the first example.

TABLE 1

Number of ranges: (3)

Range A: (starting logical address = 100, length = 3)
Range B: (starting logical address = 200, length = 3)
Range C: (starting logical address = 301, length = 2)

In a second example, the header information may include an indication of the starting logical address for the first range (e.g., range A), the respective length of each range, and the difference between the starting logical address for the first range and the starting logical address of the other ranges. For example, the header information may indicate the difference between the starting address of range A and the starting address of range B as 100. As another example, the header information may indicate the difference between the starting address of range A and the starting address of range C as 201. In the second example the header information may also indicate the quantity or ranges (e.g., three) indicated by the multi-range write command. Relative to other techniques, the second example may reduce the size of the header information (e.g., because the difference between logical addresses may consume fewer bits than full logical addresses). Table 2 illustrates header information according to the second example.

TABLE 2

Number of ranges: (3)

Range A: (starting logical address = 100, length = 3)
Range B: (difference = 100, length = 3)
Range C: (difference = 201, length = 2)

At 330, the memory system 310 may use the header information to determine the ranges of contiguous logical addresses for the sets of data included in the sequence of data. For instance, the memory system 310 may use the respective starting logical address for each range (e.g., 100, 200, 301) and the respective length of each range (e.g., 3, 3, 2) to determine the contiguous logical addresses for each set of data included in the sequence of data. Or the memory system 310 may use the starting logical address for the first range (e.g., range A), the respective length of each range, and the difference between the starting logical address for the first range and the starting logical address of the other ranges to determine the contiguous logical addresses for each set of data included in the sequence of data.

At 335, the memory system 310 may transmit a request for a set of data that is included in the sequence of data. For example, the memory system 310 may transmit a request for the set of data associated with range A. The request may include header information that indicates the set of data. For example, the header information may indicate the starting address or the difference for the range associated with the set of data. In some examples, the request may be a request to transfer (RTT) UFS Protocol Information Unit (UPIU).

At 340, the host system 305 may transmit the set of data requested by the memory device at 335. The host system 305 may transmit the set of data based on (e.g., in response to) the request received at 335. In some examples, the set of data may be included in a Data Out UPIU that also includes a header with header information that indicates the range associated with the set of data.

At 345, the memory system 310 may write the set of data received at 340, for example, to a volatile memory buffer. At 350, the memory system 310 may determine whether the set of data is included in the sequence of data. The memory system 310 may determine that the set of data is included in the sequence of data based on (e.g., by comparing) the header information associated with the set of data and the header information associated with the multi-range write command. For example, the memory system 310 may use the header information associated with the set of data to determine that the set of data is associated with a range of logical addresses indicated by the multi-range write command.

At 355, the memory system 310 may copy the data from the buffer to the non-volatile memory (e.g., the memory system 310 may flush the data in the buffer). The memory system 310 may copy the data from the buffer to the non-volatile memory based on or in response to a trigger condition (e.g., the buffer reaching a threshold capacity). Copying data from the buffer to the non-volatile memory may include reading the data from the buffer and writing the data to the non-volatile memory. In some examples, the data flushed from the buffer may include one or more sets of data that are included in the sequence of data. In such a scenario, the memory system 310 may write the sets of data to the non-volatile memory together with information, such as atomic metadata, that indicates the inclusion of the sets of data in the sequence of data. For example, for each atomic set of data written to a page of the non-volatile memory the memory system 310 may write atomic metadata to the page that indicates that set of data is included in the sequence of data.

If a set of data is determined to be the first set of data in the sequence of data, the memory system 310 may include a flag in the information, such as the metadata, that indicates the set of data is the first set of data. Similarly, if a set of data is determined to be the last set of data in the sequence of data, the memory system 310 may include a flag in the information, such as the metadata, that indicates the set of data is the last set of data. Writing information, such as the atomic metadata, to the non-volatile memory may allow the memory system 310 to determine the storage status of the sequence of data if a failure event occurs and may help the memory system 310 perform remedial actions in the event that only a portion of the sequence of data is written to the non-volatile memory.

The operations at 335 through 355 may repeat for one or more additional sets of data until the entire sequence of data has been received.

At 360, the memory system 310 may determine that the entire sequence of data has been received. For example, the memory system 310 may determine that the sets of data associated with the three ranges (for example) indicated by the multi-range write command have been received. At 365, the memory system 310 may transmit a response to the multi-range write command that indicates the sequence of data associated with the multi-range write command has been received.

At 370, the memory system 310 may detect an adverse event, such as a failure event. For example, the memory system 310 may determine that a power loss has occurred or that the memory system 310 has been reset.

At 375, based on (e.g., in response to) detecting the failure event, the memory system 310 may use the information, such as the atomic metadata, to determine the storage status of the sequence of data. For example, the memory system 310 may use the metadata to determine whether the first and last sets of data for the sequence of data are written to the non-volatile memory. If the first and last sets of data for the sequence of data are written to the non-volatile memory, the memory system 310 may determine that the entire sequence of data was written to the non-volatile memory. If both the first and last sets of data for the sequence of data are not written to the non-volatile memory (e.g., if only the first set of data is written to the non-volatile memory), the memory system 310 may determine that only a portion of the sequence of data was written to the non-volatile memory.

At 380, the memory system 310 may determine whether the entire sequence of data was written to the non-volatile memory. If, at 380, the memory system 310 determines that the entire sequence of data was written to the non-volatile memory, the memory system 310 may proceed without performing remedial actions. If, at 380, the memory system 310 determines that the entire sequence of data was not written to the non-volatile memory, the memory system 310 may perform one or more remedial actions, such as discarding the portion of the sequence of data written to the non-volatile memory. The memory system 310 may identify the one or more sets of data to discard based on (e.g., indicated by) the atomic metadata.

Thus, the host system 305 and the memory system 310 may use a multi-range write command to implement an atomic write operation. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 4:
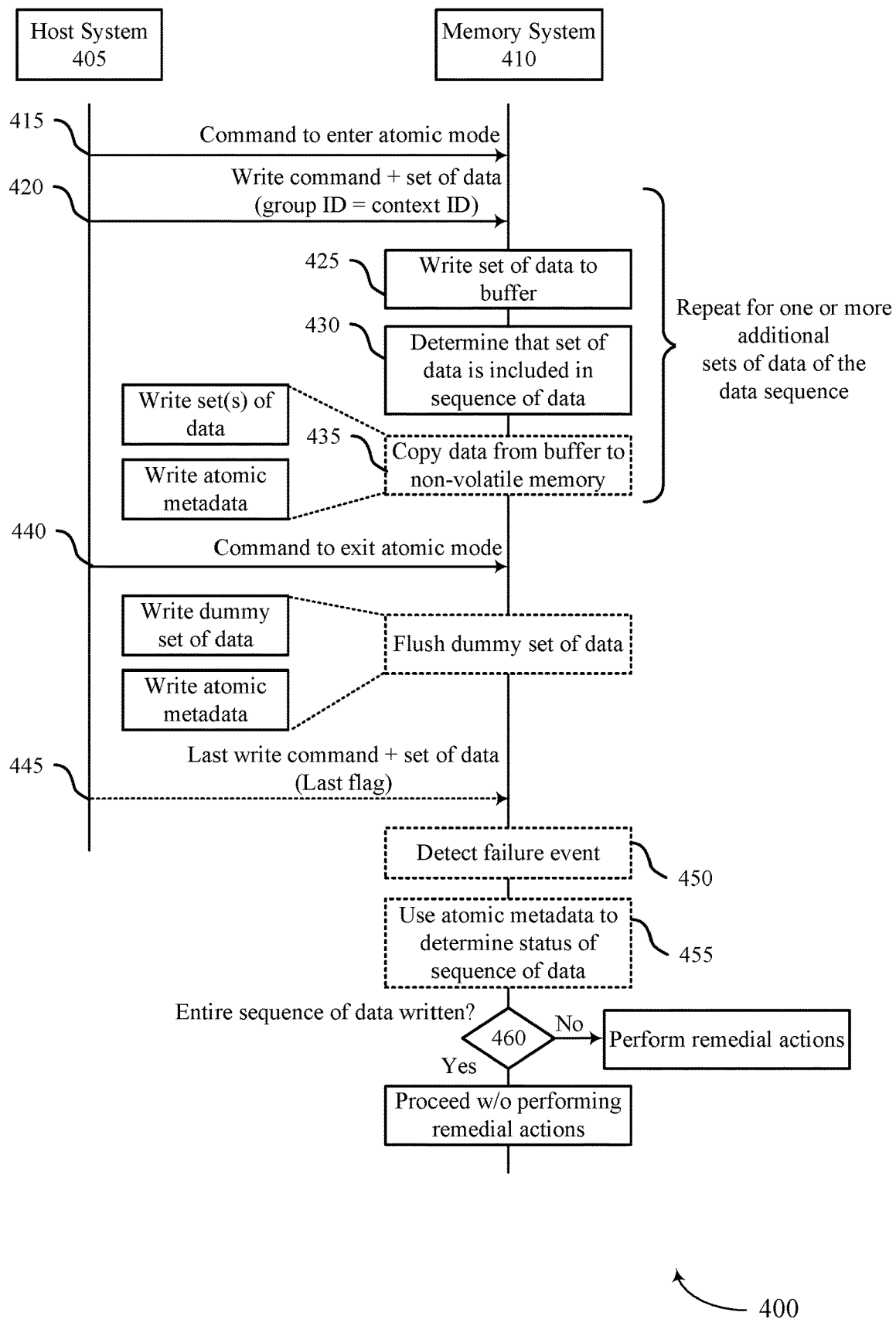
FIG. 4 illustrates an example of a process flow that supports atomic write operations in accordance with examples as disclosed herein.

FIG. 4 illustrates an example of a process flow 400 that supports atomic write operations in accordance with examples as disclosed herein. The process flow 400 may be implemented by a host system 405 and a memory system 410 (among other examples), which may be examples of a host system and a memory system described herein. In process flow 400, the host system 405 and the memory system 410 may use an atomic mode (which may also be referred to as an atomic context) to implement an atomic write operation.

Aspects of the process flow 400 may be implemented by one or more controllers, among other components. Additionally or alternatively, aspects of the process flow 400 may be implemented as instructions stored in memory (e.g., firmware stored in a memory coupled with the host system 405 or the memory system 410). For example, the instructions, if executed by a controller (e.g., the host system controller 106, the memory system controller 115, a local controller 135), may cause the controller to perform the operations of the process flow 400.

At 415, the host system 405 may transmit to the memory system 410 a command that indicates the memory system 410 is to enter the atomic mode (e.g., open the atomic context). In some examples, the command may be a query command that instructs the memory system 410 to set a mode register bit associated with the atomic mode. The atomic mode may be associated with a value, such as an atomic identifier.

At 420, the host system 405 may transmit, and the memory system 410 may receive, a write command and an associated set of data that is included in an atomic sequence of data. The write command may indicate the atomic mode identifier. For example, the write command may include a group identifier that is equal to or otherwise linked with the atomic mode identifier. The group identifier may also be referred to a group number or other suitable terminology. By including the group identifier equal to or otherwise linked with the atomic mode identifier in the write command, the host system 405 may indicate that the write command is for the atomic write operation (and thus that the set of data is included in the sequence of data).

At 425, the memory system 410 may write the set of data received at 420 to a location, such as a volatile memory buffer. At 430, the memory system 410 may determine that the set of data is included in the sequence of data. The memory system 410 may determine that the set of data is included in the sequence of data based on the group identifier matching (e.g., being equal to) the atomic mode identifier.

At 435, the memory system 410 may copy the data in the buffer to the non-volatile memory (e.g., the memory system 410 may flush the data in the buffer). The memory system 410 may copy the data in the buffer to the non-volatile memory in response to a trigger condition (e.g., the buffer reaching a threshold capacity). Copying data from the buffer to the non-volatile memory may include reading the data from the buffer and writing the data to the non-volatile memory.

In some examples, the data flushed from the buffer may include one or more sets of data that are included in the sequence of data. In such a scenario, the memory system 410 may write the sets of data to the non-volatile memory together with information, such as atomic metadata, that indicates the inclusion of the sets of data in the sequence of data. For example, for each atomic set of data written to a page of the non-volatile memory the memory system 410 may write atomic metadata (e.g., the group identifier) to the page that indicates that set of data is included in the sequence of data. If a set of data is determined to be the first set of data in the sequence of data, the memory system 410 may include a flag or other indication in the information, such as the metadata, that indicates the set of data is the first set of data. Similarly, if a set of data is determined to be the last set of data in the sequence of data, the memory system 410 may include a flag or other indication in the information, such as the metadata, that indicates the set of data is the last set of data. Writing information, such as atomic metadata, to the non-volatile memory may allow the memory system 410 to determine the storage status of the sequence of data if a failure event occurs and may help the memory system 410 perform remedial actions in the event that only a portion of the sequence of data is written to the non-volatile memory The operations at 420 through 435 may repeat for one or more additional sets of data of the sequence of data.

At 440, the host system 405 may transmit to the memory system 410 a command that indicates the memory system 410 is to exit the atomic mode (e.g., to close the atomic context). In some examples, the command may be a query command that instructs the memory system 410 to clear the a mode register bit associated with the atomic mode. In some examples the memory system may wait until all the data belonging to the atomic sequence is safely stored in the non-volatile media before responding to the query command.

In some other examples, the command to exit the atomic mode may be received after the memory system 410 has flushed a set of data that, unknown to the memory system 410, is the last set of data for the sequence of data (which means that the metadata for the last set of data for the data sequence may not include a flag indicating the status of the set of data as the last set of data). In such a scenario, the memory system 410 may flush a dummy (e.g., random) set of data to the non-volatile memory and mark the dummy set of data as the last set of data in the sequence of data. For example, upon receipt of the command to exit the atomic mode, the memory system 410 may write the dummy set of data to the non-volatile memory together with atomic metadata that indicates the dummy set of data is the last set of data in the sequence of data (even though the dummy set of data is not actually included in the sequence of data). Alternatively, the host system 405 A) transmit the command to exit the atomic mode before the last write command for the sequence of data and B) include a flag (e.g., one or more bits) that indicates the write command transmitted at 445 is the last write command for the sequence of data. This way, the memory system 410 may know to include a flag in the atomic metadata for the set of data that indicates the set of data is the last set of data for the sequence of data. In response to the last write command, the memory system 410 may perform operations similar to those at 425, 430, and 435.

At 450, the memory system 410 may detect a failure event. For example, the memory system 410 may determine that a power loss has occurred or that the memory system 410 has been reset.

At 455, based on (e.g., in response to) detecting the failure event, the memory system 410 may use the atomic metadata to determine the storage status of the sequence of data. For example, the memory system 410 may use the metadata to determine whether the first and last sets of data for the sequence of data are written to the non-volatile memory. If the first and last sets of data for the sequence of data are written to the non-volatile memory, the memory system 410 may determine that the entire sequence of data was written to the non-volatile memory. If any data between the first and last sets of data for the sequence of data are not written to the non-volatile memory (e.g., can't be correctly read), the memory system 410 may determine that only a portion of the sequence of data was written to the non-volatile memory.

At 460, the memory system 410 may determine whether the entire sequence of data was written to the non-volatile memory. If, at 460, the memory system 410 determines that the entire sequence of data was written to the non-volatile memory, the memory system 410 may proceed without performing remedial actions. If, at 460, the memory system 410 determines that the entire sequence of data was not written to the non-volatile memory, the memory system 410 may perform one or more remedial actions, such as discarding the portion of the sequence of data written to the non-volatile memory. The memory system 410 may identify the sets of data to discard based on (e.g., indicated by) the atomic metadata.

Thus, the host system 405 and the memory system 410 may use an atomic mode to implement an atomic write operation. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
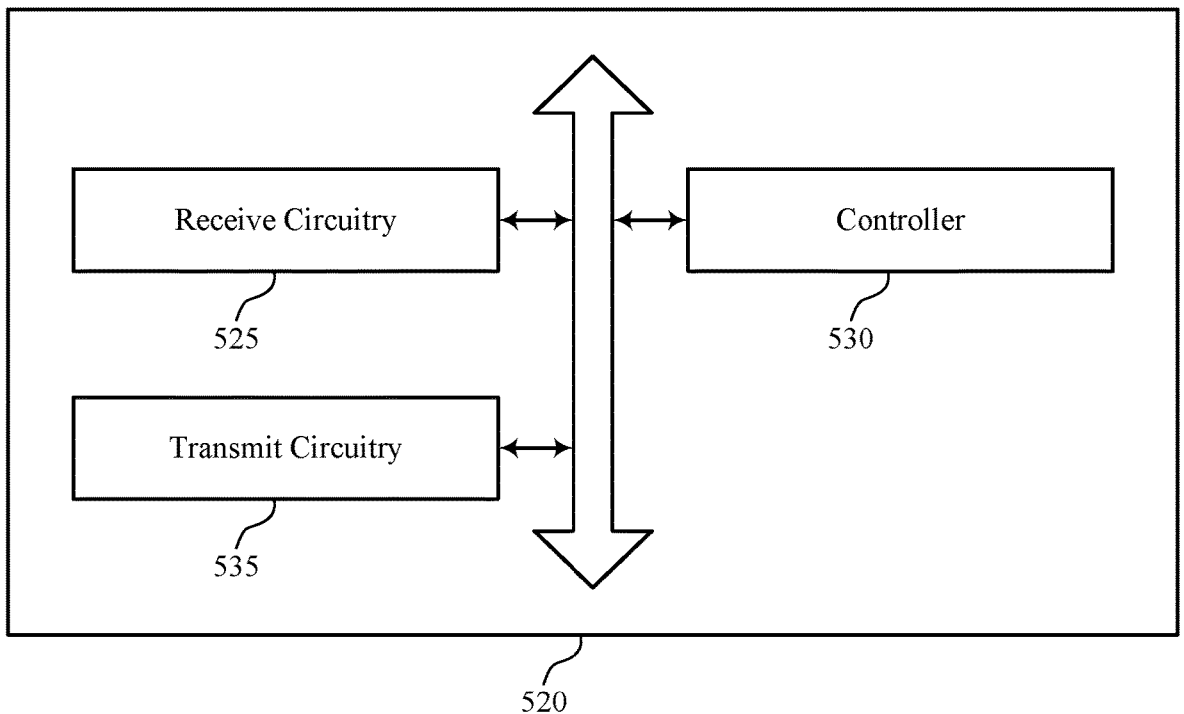
FIG. 5 shows a block diagram of a host system that supports atomic write operations in accordance with examples as disclosed herein.

FIG. 5 shows a block diagram 500 of a host system 520 that supports atomic write operations in accordance with examples as disclosed herein. The host system 520 may be an example of aspects of a host system as described with reference to FIGS. 1 through 4. The host system 520, or various components thereof, may be an example of means for performing various aspects of atomic write operations as described herein. For example, the host system 520 may include a receive circuitry 525, a controller 530, a transmit circuitry 535, or any combination thereof. Each of these components may communicate, directly or indirectly, with one another (e.g., via one or more buses).

The receive circuitry 525 may be configured as or otherwise support a means for receiving a sequence of data associated with an application of a host system, the sequence of data including a first set of data and a second set of data.

The controller 530 may be configured as or otherwise support a means for determining, based at least in part on the sequence of data, a first set of contiguous logical addresses for the first set of data and a second set of contiguous logical addresses for the second set of data. The transmit circuitry 535 may be configured as or otherwise support a means for transmitting, to a memory system, a write command that indicates the first set of contiguous logical addresses and the second set of contiguous logical addresses, the first set of contiguous logical addresses being discontiguous with the second set of contiguous logical addresses.

In some examples, the controller 530 may be configured as or otherwise support a means for determining whether the second set of data is a last set of data for the sequence of data, where the write command is transmitted after determining that the second set of data is the last set of data.

In some examples, the receive circuitry 525 may be configured as or otherwise support a means for receiving a request for the first set of data from the memory system based at least in part on the write command. In some examples, the transmit circuitry 535 may be configured as or otherwise support a means for transmitting the first set of data based at least in part on the request.

In some examples, the receive circuitry 525 may be configured as or otherwise support a means for receiving a request for the second set of data from the memory system based at least in part on the write command and after transmitting the first set of data. In some examples, the transmit circuitry 535 may be configured as or otherwise support a means for transmitting the second set of data based at least in part on the request for the second set of data. In some examples, the receive circuitry 525 may be configured as or otherwise support a means for receiving a response indicating the entire sequence of data has been received by the memory system based at least in part on transmitting the second set of data.

In some examples, the write command indicates a starting logical address for the first set of contiguous logical addresses and a quantity of the first set of contiguous logical addresses. In some examples, the write command further indicates a starting logical address for the second set of contiguous logical addresses and a quantity of the second set of contiguous logical addresses.

In some examples, the write command indicates a starting logical address for the first set of contiguous logical addresses, a quantity of the first set of contiguous logical addresses, a difference between the starting logical address for the first set of contiguous logical addresses and a starting address for the second set of contiguous logical addresses, and a quantity of the second set of contiguous logical addresses.

In some examples, the controller 530 may be configured as or otherwise support a means for determining the difference between the starting logical address for the first set of contiguous logical addresses and the starting logical address for the second set of contiguous logical addresses where the indication of the difference is included in the write command based at least in part on determining the difference.

In some examples, the write command indicates that the first set of contiguous logical addresses is discontiguous with the second set of contiguous logical addresses.

Figure 6:
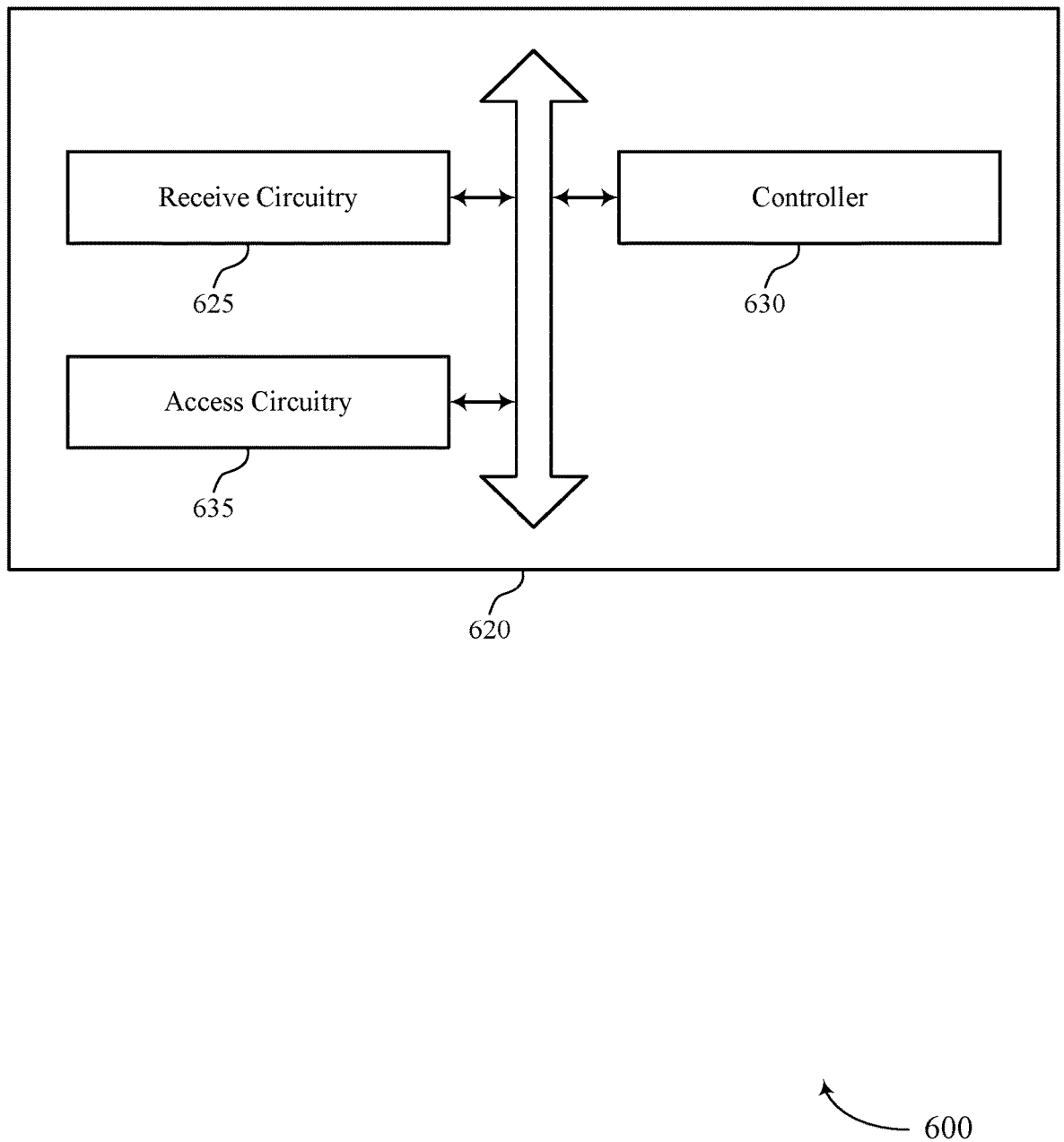
FIG. 6 shows a block diagram of a memory system that supports atomic write operations in accordance with examples as disclosed herein.

FIG. 6 shows a block diagram 600 of a memory system 620 that supports atomic write operations in accordance with examples as disclosed herein. The memory system 620 may be an example of aspects of a memory system as described with reference to FIGS. 1 through 4. The memory system 620, or various components thereof, may be an example of means for performing various aspects of atomic write operations as described herein. For example, the memory system 620 may include a receive circuitry 625, a controller 630, an access circuitry 635, or any combination thereof. Each of these components may communicate, directly or indirectly, with one another (e.g., via one or more buses).

The receive circuitry 625 may be configured as or otherwise support a means for receiving, from a host system, a write command that indicates a first set of contiguous logical addresses for a first set of data and a second set of contiguous logical addresses for a second set of data, the first set of contiguous logical addresses being discontiguous with the second set of contiguous logical addresses. The controller 630 may be configured as or otherwise support a means for determining, based at least in part on the write command, that the first set of data and the second set of data are included in a sequence of data. The access circuitry 635 may be configured as or otherwise support a means for writing, to a non-volatile memory of a memory system, a first set of metadata for the first set of data and a second set of metadata for the second set of data, the first set of metadata indicating that the first set of data is included in the sequence of data and the second set of metadata indicating that the second set of data included in the sequence of data.

In some examples, the controller 630 may be configured as or otherwise support a means for determining, in response to a failure event and based at least in part on the first set of metadata and the second set of metadata, whether only a portion of the sequence of data has been written to the non-volatile memory. In some examples, the access circuitry 635 may be configured as or otherwise support a means for discarding the portion of the sequence of data based at least in part on determining that only the portion of the sequence of data has been written.

In some examples, the access circuitry 635 may be configured as or otherwise support a means for writing the first set of data together with the first set of metadata to the non-volatile memory. In some examples, the access circuitry 635 may be configured as or otherwise support a means for writing the second set of data to the non-volatile memory together with the second set of metadata to the non-volatile memory.

In some examples, the receive circuitry 625 may be configured as or otherwise support a means for receiving the first set of data in response to a request for the first set of data. In some examples, the receive circuitry 625 may be configured as or otherwise support a means for receiving the second set of data in response to a request for the second set of data and after receiving the first set of data.

In some examples, the controller 630 may be configured as or otherwise support a means for determining whether the second set of data is a last set of data included in the sequence of data, where the second set of metadata includes an indication that the second set of data is the last set of data.

In some examples, the write command indicates a starting logical address for the first set of contiguous logical addresses and a quantity of the first set of contiguous logical addresses. In some examples, the write command further indicates a starting logical address for the second set of contiguous logical addresses and a quantity of the second set of contiguous logical addresses.

In some examples, the controller 630 may be configured as or otherwise support a means for determining the first set of contiguous logical addresses based at least in part on the starting logical address for the first set of contiguous logical addresses and the quantity of the first set of contiguous logical addresses. In some examples, the controller 630 may be configured as or otherwise support a means for determining the second set of contiguous logical addresses based at least in part on the starting logical address for the second set of contiguous logical addresses and the quantity of the second set of contiguous logical addresses.

In some examples, the write command indicates a starting logical address for the first set of contiguous logical addresses a quantity of the first set of contiguous logical addresses, a difference between the starting logical address for the first set of contiguous logical addresses and a starting address for the second set of contiguous logical addresses, and a quantity of the second set of contiguous logical addresses.

In some examples, the controller 630 may be configured as or otherwise support a means for determining the first set of contiguous logical addresses based at least in part on the starting logical address for the first set of contiguous logical addresses and the quantity of the first set of contiguous logical addresses. In some examples, the controller 630 may be configured as or otherwise support a means for determining the second set of contiguous logical addresses based at least in part on the starting logical address for the first set of contiguous logical addresses, the difference, and the quantity of the second set of contiguous logical addresses.

In some examples, the receive circuitry 625 may be configured as or otherwise support a means for receiving, from a host system, a command to enter a mode for receiving a sequence of data. In some examples, the receive circuitry 625 may be configured as or otherwise support a means for receiving a write command for a set of data based at least in part on receiving the command to enter the mode, the write command including an identifier equal to a value associated with the mode. In some examples, the controller 630 may be configured as or otherwise support a means for determining whether the set of data is included in the sequence of data based at least in part on the identifier being equal to the value associated with the mode. In some examples, the access circuitry 635 may be configured as or otherwise support a means for writing a set of metadata for the set of data to a non-volatile memory of a memory system based at least in part on determining that the set of data is included in the sequence of data, the set of metadata indicating that the set of data is included in the sequence of data.

In some examples, the controller 630 may be configured as or otherwise support a means for determining, in response to a failure event and based at least in part on the set of metadata, whether only a portion of the sequence of data has been written to the non-volatile memory. In some examples, the access circuitry 635 may be configured as or otherwise support a means for discarding the portion of the sequence of data based at least in part on determining that only the portion has been written.

In some examples, the access circuitry 635 may be configured as or otherwise support a means for writing the set of data to the non-volatile memory together with the set of metadata to the non-volatile memory.

In some examples, the controller 630 may be configured as or otherwise support a means for determining whether the set of data is a last set of data for the sequence of data, where the set of metadata includes an indication that the set of data is the last set of data for the sequence of data.

In some examples, the controller 630 may be configured as or otherwise support a means for determining whether the set of data is a first set of data for the sequence of data, where the set of metadata includes an indication that the set of data is the first set of data for the sequence of data.

In some examples, the receive circuitry 625 may be configured as or otherwise support a means for receiving, from the host system after writing the set of data to the non-volatile memory, a second command to exit the mode for receiving the sequence of data. In some examples, the access circuitry 635 may be configured as or otherwise support a means for writing, to the non-volatile memory, a second set of metadata for a second set of data that is not included in the sequence of data, the second set of metadata including an indication that the second set of data is a last set of data for the sequence of data.

In some examples, the receive circuitry 625 may be configured as or otherwise support a means for receiving, from the host system after writing the set of data to the non-volatile memory, a second command to exit the mode for receiving the sequence of data, where the second command is received before a last write command for the sequence of data.

In some examples, the receive circuitry 625 may be configured as or otherwise support a means for receiving a second write command for a second set of data, the second write command including a second identifier equal to the value and including an indication that the second write command is a last write command for the sequence of data.

Figure 7:
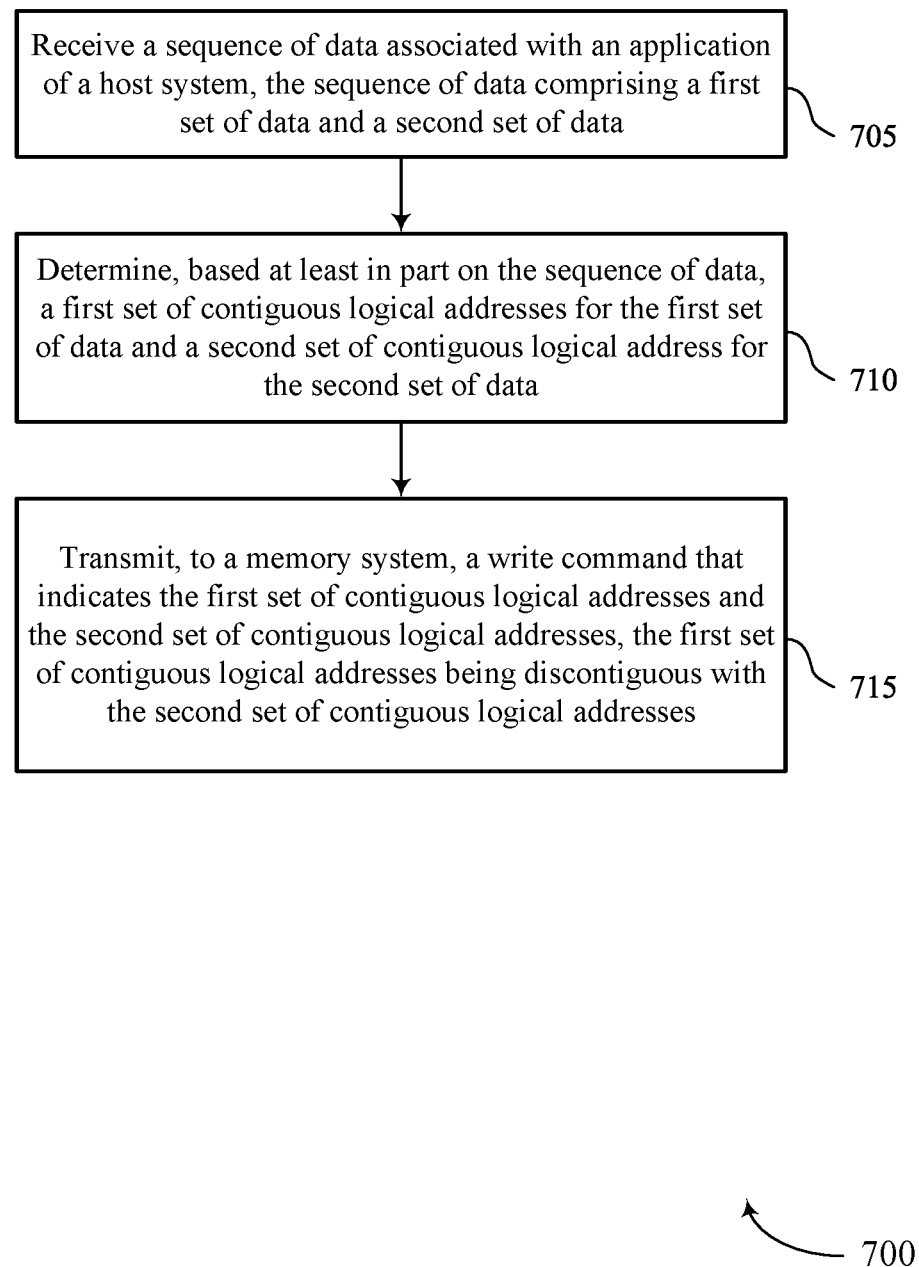
FIGS. 7 through 9 show flowcharts illustrating a method or methods that support atomic write operations in accordance with examples as disclosed herein.

FIG. 7 shows a flowchart illustrating a method 700 that supports atomic write operations in accordance with examples as disclosed herein. The operations of method 700 may be implemented by a host system or its components as described herein. For example, the operations of method 700 may be performed by a host system as described with reference to FIGS. 1 through 5. In some examples, a host system may execute a set of instructions to control the functional elements of the device to perform the described functions. Additionally or alternatively, the host system may perform aspects of the described functions using special-purpose hardware.

At 705, the method may include receiving a sequence of data associated with an application of a host system, the sequence of data including a first set of data and a second set of data. The operations of 705 may be performed in accordance with examples as disclosed herein. In some examples, aspects of the operations of 705 may be performed by a receive circuitry 525 as described with reference to FIG. 5.

At 710, the method may include determining, based at least in part on the sequence of data, a first set of contiguous logical addresses for the first set of data and a second set of contiguous logical addresses for the second set of data. The operations of 710 may be performed in accordance with examples as disclosed herein. In some examples, aspects of the operations of 710 may be performed by a controller 530 as described with reference to FIG. 5.

At 715, the method may include transmitting, to a memory system, a write command that indicates the first set of contiguous logical addresses and the second set of contiguous logical addresses, the first set of contiguous logical addresses being discontiguous with the second set of contiguous logical addresses. The operations of 715 may be performed in accordance with examples as disclosed herein. In some examples, aspects of the operations of 715 may be performed by a transmit circuitry 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a sequence of data associated with an application of a host system, the sequence of data including a first set of data and a second set of data; determining, based at least in part on the sequence of data, a first set of contiguous logical addresses for the first set of data and a second set of contiguous logical addresses for the second set of data; and transmitting, to a memory system, a write command that indicates the first set of contiguous logical addresses and the second set of contiguous logical addresses, the first set of contiguous logical addresses being discontiguous with the second set of contiguous logical addresses.

Aspect 2: The method, apparatus, or non-transitory computer-readable medium of aspect 1, further including operations, features, circuitry, logic, means, or instructions, or any combination thereof for determining whether the second set of data is a last set of data for the sequence of data, where the write command is transmitted after determining that the second set of data is the last set of data.

Aspect 3: The method, apparatus, or non-transitory computer-readable medium of any of aspects 1 through 2, further including operations, features, circuitry, logic, means, or instructions, or any combination thereof for receiving a request for the first set of data from the memory system based at least in part on the write command and transmitting the first set of data based at least in part on the request.

Aspect 4: The method, apparatus, or non-transitory computer-readable medium of aspect 3, further including operations, features, circuitry, logic, means, or instructions, or any combination thereof for receiving a request for the second set of data from the memory system based at least in part on the write command and after transmitting the first set of data; transmitting the second set of data based at least in part on the request for the second set of data; and receiving a response indicating the entire sequence of data has been received by the memory system based at least in part on transmitting the second set of data.

Aspect 5: The method, apparatus, or non-transitory computer-readable medium of any of aspects 1 through 4 where the write command indicates a starting logical address for the first set of contiguous logical addresses and a quantity of the first set of contiguous logical addresses and the write command further indicates a starting logical address for the second set of contiguous logical addresses and a quantity of the second set of contiguous logical addresses.

Aspect 6: The method, apparatus, or non-transitory computer-readable medium of any of aspects 1 through 5 where the write command indicates a starting logical address for the first set of contiguous logical addresses, a quantity of the first set of contiguous logical addresses, a difference between the starting logical address for the first set of contiguous logical addresses and a starting address for the second set of contiguous logical addresses, and a quantity of the second set of contiguous logical addresses.

Aspect 7: The method, apparatus, or non-transitory computer-readable medium of aspect 6, further including operations, features, circuitry, logic, means, or instructions, or any combination thereof for determining the difference between the starting logical address for the first set of contiguous logical addresses and the starting logical address for the second set of contiguous logical addresses where the indication of the difference is included in the write command based at least in part on determining the difference.

Aspect 8: The method, apparatus, or non-transitory computer-readable medium of any of aspects 1 through 7 where the write command indicates that the first set of contiguous logical addresses is discontiguous with the second set of contiguous logical addresses.

Figure 8:
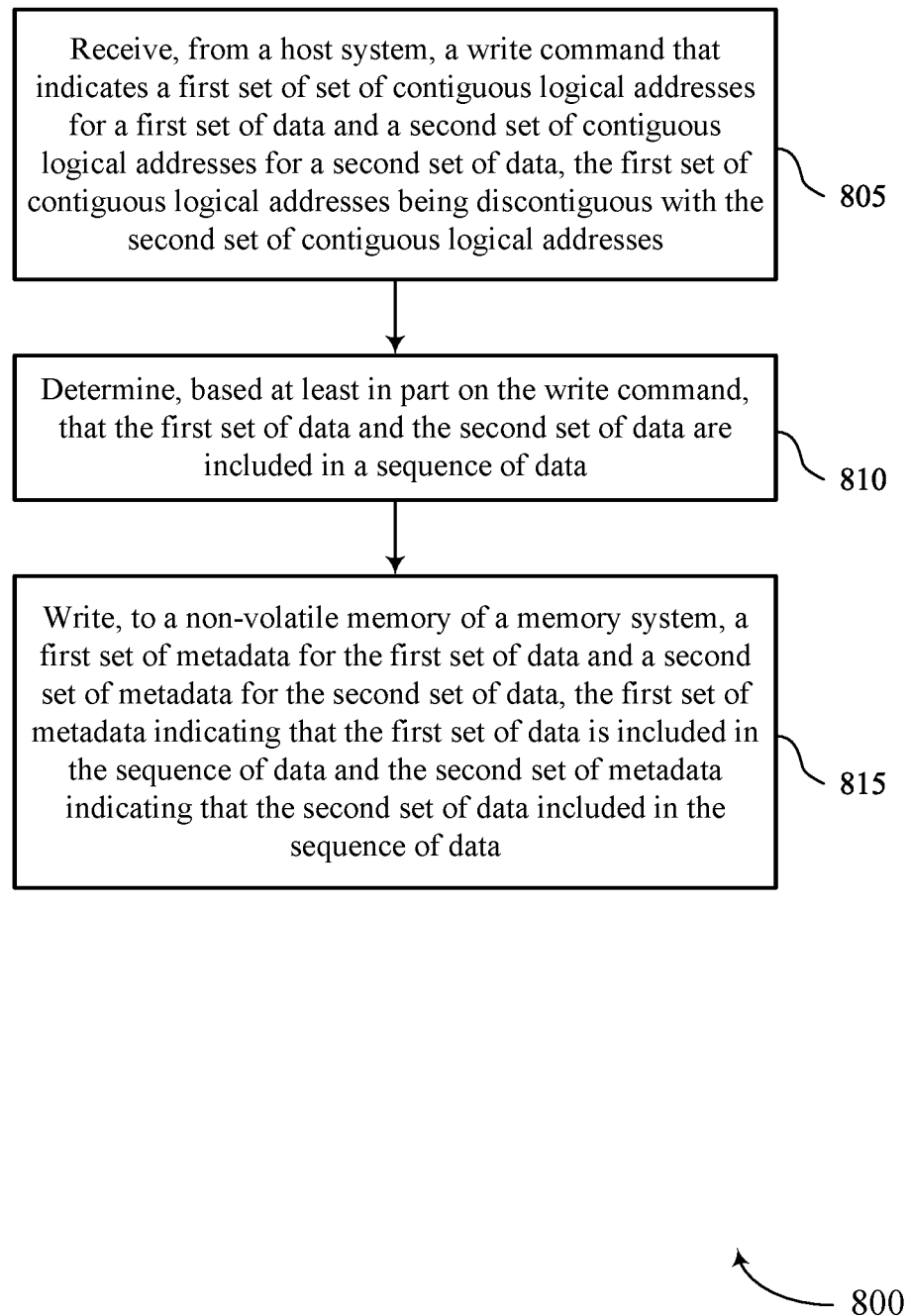

FIG. 8 shows a flowchart illustrating a method 800 that supports atomic write operations in accordance with examples as disclosed herein. The operations of method 800 may be implemented by a memory system or its components as described herein. For example, the operations of method 800 may be performed by a memory system as described with reference to FIGS. 1 through 4 and 6. In some examples, a memory system may execute a set of instructions to control the functional elements of the device to perform the described functions. Additionally or alternatively, the memory system may perform aspects of the described functions using special-purpose hardware.

At 805, the method may include receiving, from a host system, a write command that indicates a first set of contiguous logical addresses for a first set of data and a second set of contiguous logical addresses for a second set of data, the first set of contiguous logical addresses being discontiguous with the second set of contiguous logical addresses. The operations of 805 may be performed in accordance with examples as disclosed herein. In some examples, aspects of the operations of 805 may be performed by a receive circuitry 625 as described with reference to FIG. 6.

At 810, the method may include determining, based at least in part on the write command, that the first set of data and the second set of data are included in a sequence of data. The operations of 810 may be performed in accordance with examples as disclosed herein. In some examples, aspects of the operations of 810 may be performed by a controller 630 as described with reference to FIG. 6.

At 815, the method may include writing, to a non-volatile memory of a memory system, a first set of metadata for the first set of data and a second set of metadata for the second set of data, the first set of metadata indicating that the first set of data is included in the sequence of data and the second set of metadata indicating that the second set of data included in the sequence of data. The operations of 815 may be performed in accordance with examples as disclosed herein. In some examples, aspects of the operations of 815 may be performed by an access circuitry 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 9: A method, apparatus, or non-transitory computer-readable medium including operations, features, circuitry, logic, means, or instructions, or any combination thereof for receiving, from a host system, a write command that indicates a first set of contiguous logical addresses for a first set of data and a second set of contiguous logical addresses for a second set of data, the first set of contiguous logical addresses being discontiguous with the second set of contiguous logical addresses; determining, based at least in part on the write command, that the first set of data and the second set of data are included in a sequence of data; and writing, to a non-volatile memory of a memory system, a first set of metadata for the first set of data and a second set of metadata for the second set of data, the first set of metadata indicating that the first set of data is included in the sequence of data and the second set of metadata indicating that the second set of data included in the sequence of data.

Aspect 10: The method, apparatus, or non-transitory computer-readable medium of aspect 9, further including operations, features, circuitry, logic, means, or instructions, or any combination thereof for determining, in response to a failure event and based at least in part on the first set of metadata and the second set of metadata, whether only a portion of the sequence of data has been written to the non-volatile memory and discarding the portion of the sequence of data based at least in part on determining that only the portion of the sequence of data has been written.

Aspect 11: The method, apparatus, or non-transitory computer-readable medium of any of aspects 9 through 10, further including operations, features, circuitry, logic, means, or instructions, or any combination thereof for writing the first set of data together with the first set of metadata to the non-volatile memory and writing the second set of data to the non-volatile memory together with the second set of metadata to the non-volatile memory.

Aspect 12: The method, apparatus, or non-transitory computer-readable medium of aspect 11, further including operations, features, circuitry, logic, means, or instructions, or any combination thereof for receiving the first set of data in response to a request for the first set of data and receiving the second set of data in response to a request for the second set of data and after receiving the first set of data.

Aspect 13: The method, apparatus, or non-transitory computer-readable medium of any of aspects 9 through 12, further including operations, features, circuitry, logic, means, or instructions, or any combination thereof for determining whether the second set of data is a last set of data included in the sequence of data, where the second set of metadata includes an indication that the second set of data is the last set of data.

Aspect 14: The method, apparatus, or non-transitory computer-readable medium of any of aspects 9 through 13 where the write command indicates a starting logical address for the first set of contiguous logical addresses and a quantity of the first set of contiguous logical addresses and the write command further indicates a starting logical address for the second set of contiguous logical addresses and a quantity of the second set of contiguous logical addresses.

Aspect 15: The method, apparatus, or non-transitory computer-readable medium of aspect 14, further including operations, features, circuitry, logic, means, or instructions, or any combination thereof for determining the first set of contiguous logical addresses based at least in part on the starting logical address for the first set of contiguous logical addresses and the quantity of the first set of contiguous logical addresses and determining the second set of contiguous logical addresses based at least in part on the starting logical address for the second set of contiguous logical addresses and the quantity of the second set of contiguous logical addresses.

Aspect 16: The method, apparatus, or non-transitory computer-readable medium of any of aspects 9 through 15 where the write command indicates a starting logical address for the first set of contiguous logical addresses a quantity of the first set of contiguous logical addresses, a difference between the starting logical address for the first set of contiguous logical addresses and a starting address for the second set of contiguous logical addresses, and a quantity of the second set of contiguous logical addresses.

Aspect 17: The method, apparatus, or non-transitory computer-readable medium of aspect 16, further including operations, features, circuitry, logic, means, or instructions, or any combination thereof for determining the first set of contiguous logical addresses based at least in part on the starting logical address for the first set of contiguous logical addresses and the quantity of the first contiguous logical addresses and determining the second set of contiguous logical addresses based at least in part on the starting logical address for the first set of contiguous logical addresses, the difference, and the quantity of the second set of contiguous logical addresses.

Figure 9:
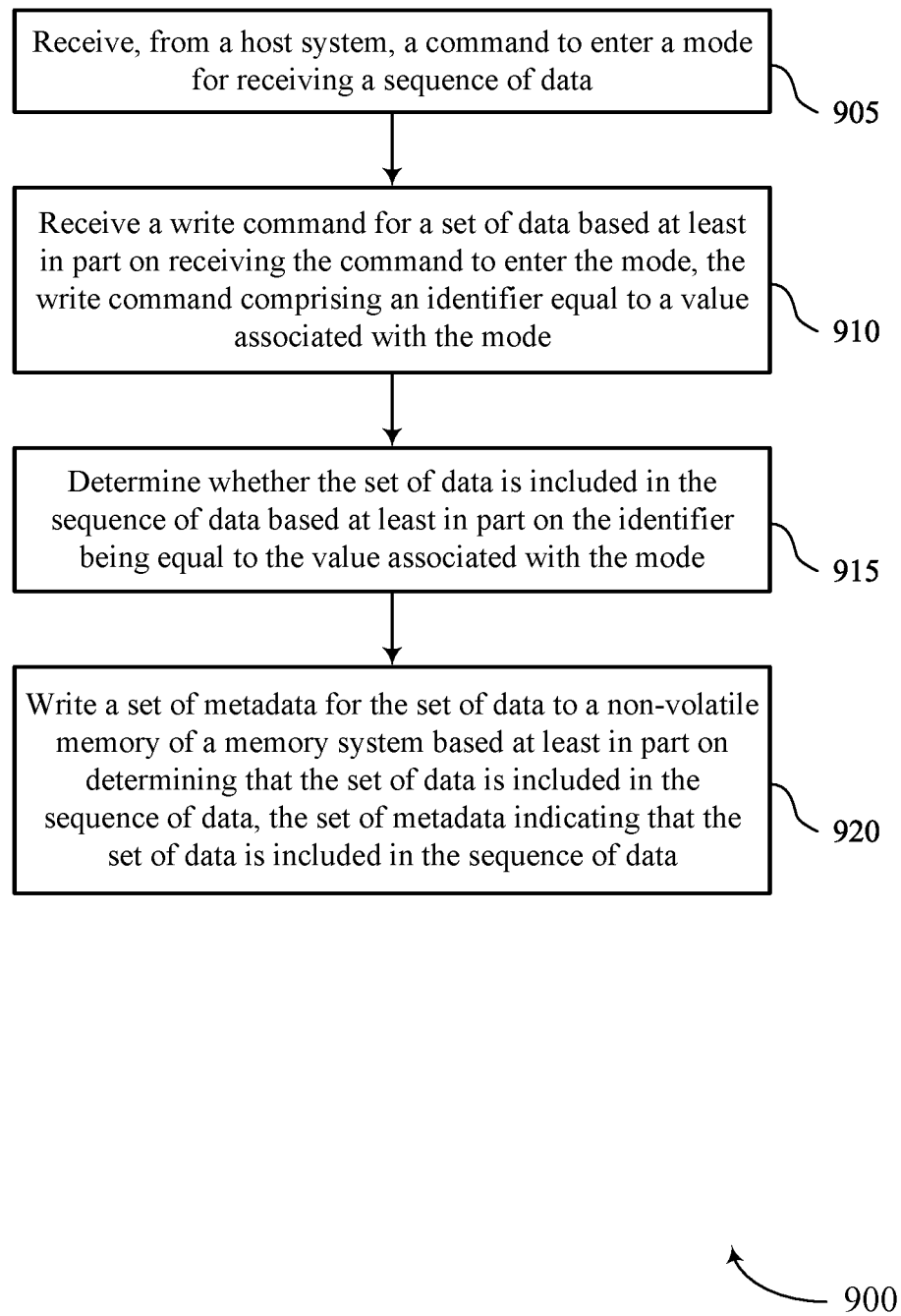

FIG. 9 shows a flowchart illustrating a method 900 that supports atomic write operations in accordance with examples as disclosed herein. The operations of method 900 may be implemented by a memory system or its components as described herein. For example, the operations of method 900 may be performed by a memory system as described with reference to FIGS. 1 through 4 and 6. In some examples, a memory system may execute a set of instructions to control the functional elements of the device to perform the described functions. Additionally or alternatively, the memory system may perform aspects of the described functions using special-purpose hardware.

At 905, the method may include receiving, from a host system, a command to enter a mode for receiving a sequence of data. The operations of 905 may be performed in accordance with examples as disclosed herein. In some examples, aspects of the operations of 905 may be performed by a receive circuitry 625 as described with reference to FIG. 6.

At 910, the method may include receiving a write command for a set of data based at least in part on receiving the command to enter the mode, the write command including an identifier equal to a value associated with the mode. The operations of 910 may be performed in accordance with examples as disclosed herein. In some examples, aspects of the operations of 910 may be performed by a receive circuitry 625 as described with reference to FIG. 6.

At 915, the method may include determining whether the set of data is included in the sequence of data based at least in part on the identifier being equal to the value associated with the mode. The operations of 915 may be performed in accordance with examples as disclosed herein. In some examples, aspects of the operations of 915 may be performed by a controller 630 as described with reference to FIG. 6.

At 920, the method may include writing a set of metadata for the set of data to a non-volatile memory of a memory system based at least in part on determining that the set of data is included in the sequence of data, the set of metadata indicating that the set of data is included in the sequence of data. The operations of 920 may be performed in accordance with examples as disclosed herein. In some examples, aspects of the operations of 920 may be performed by an access circuitry 635 as described with reference to FIG. 6.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 18: A method, apparatus, or non-transitory computer-readable medium including operations, features, circuitry, logic, means, or instructions, or any combination thereof for receiving, from a host system, a command to enter a mode for receiving a sequence of data; receiving a write command for a set of data based at least in part on receiving the command to enter the mode, the write command including an identifier equal to a value associated with the mode; determining whether the set of data is included in the sequence of data based at least in part on the identifier being equal to the value associated with the mode; and writing a set of metadata for the set of data to a non-volatile memory of a memory system based at least in part on determining that the set of data is included in the sequence of data, the set of metadata indicating that the set of data is included in the sequence of data.

Aspect 19: The method, apparatus, or non-transitory computer-readable medium of aspect 18, further including operations, features, circuitry, logic, means, or instructions, or any combination thereof for determining, in response to a failure event and based at least in part on the set of metadata, whether only a portion of the sequence of data has been written to the non-volatile memory and discarding the portion of the sequence of data based at least in part on determining that only the portion has been written.

Aspect 20: The method, apparatus, or non-transitory computer-readable medium of any of aspects 18 through 19, further including operations, features, circuitry, logic, means, or instructions, or any combination thereof for writing the set of data to the non-volatile memory together with the set of metadata to the non-volatile memory.

Aspect 21: The method, apparatus, or non-transitory computer-readable medium of any of aspects 18 through 20, further including operations, features, circuitry, logic, means, or instructions, or any combination thereof for determining whether the set of data is a last set of data for the sequence of data, where the set of metadata includes an indication that the set of data is the last set of data for the sequence of data.

Aspect 22: The method, apparatus, or non-transitory computer-readable medium of any of aspects 18 through 21, further including operations, features, circuitry, logic, means, or instructions, or any combination thereof for determining whether the set of data is a first set of data for the sequence of data, where the set of metadata includes an indication that the set of data is the first set of data for the sequence of data.

Aspect 23: The method, apparatus, or non-transitory computer-readable medium of any of aspects 18 through 22, further including operations, features, circuitry, logic, means, or instructions, or any combination thereof for receiving, from the host system after writing the set of data to the non-volatile memory, a second command to exit the mode for receiving the sequence of data and writing, to the non-volatile memory, a second set of metadata for a second set of data that is not included in the sequence of data, the second set of metadata including an indication that the second set of data is a last set of data for the sequence of data.

Aspect 24: The method, apparatus, or non-transitory computer-readable medium of any of aspects 18 through 23, further including operations, features, circuitry, logic, means, or instructions, or any combination thereof for receiving, from the host system after writing the set of data to the non-volatile memory, a second command to exit the mode for receiving the sequence of data, where the second command is received before a last write command for the sequence of data.

Aspect 25: The method, apparatus, or non-transitory computer-readable medium of any of aspects 18 through 24, further including operations, features, circuitry, logic, means, or instructions, or any combination thereof for receiving a second write command for a second set of data, the second write command including a second identifier equal to the value and including an indication that the second write command is a last write command for the sequence of data.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method comprising:
    receiving, at a host system, a sequence of data comprising first data and second data from a same application of the host system;
    transmitting, by the host system based at least in part on the first data and the second data being from the same application, a write command that indicates a first set of logical addresses for the first data and a second set of logical addresses for the second data and that indicates the first data and the second data are included in the sequence of data;
    writing, by a memory system to a non-volatile memory, the first data and the second data based at least in part on receiving the write command transmitted by the host system; and
    writing, by the memory system to the non-volatile memory, first metadata for the first data and second metadata for the second data based at least in part on the write command indicating the first data and the second data are included in the sequence of data, wherein the first metadata indicates that the first data is included in the sequence of data and the second metadata indicates that the second data is included in the sequence of data.

2. The method of claim 1, wherein the write command indicates that the memory system is to track a storage status of the sequence of data.

3. The method of claim 1, further comprising:
    receive, at the host system, an indication that the second data is a last set of data for the sequence of data, wherein transmission of the write command is delayed until after the host system receives the indication that the second data is the last set of data for the sequence of data.

4. The method of claim 1, further comprising:
    transmitting, by the memory system based at least in part on receiving the write command, a first request for the first data and a second request for the second data, wherein the first data and the second data are received based at least in part on transmitting the first request and the second request.

5. The method of claim 1, wherein the write command indicates a starting logical address for the first set of logical addresses and a quantity of the first set of logical addresses, and wherein the write command further indicates a starting logical address for the second set of logical addresses and a quantity of the second set of logical addresses.

6. The method of claim 5, further comprising:
    determining, by the memory system, the first set of logical addresses based at least in part on the starting logical address for the first set of logical addresses and on the quantity of the first set of logical addresses; and
    determining, by the memory system, the second set of logical addresses based at least in part on the starting logical address for the second set of logical addresses and on the quantity of the second set of logical addresses.

7. The method of claim 1, wherein the write command indicates a starting logical address for the first set of logical addresses, a quantity of the first set of logical addresses, a difference between the starting logical address for the first set of logical addresses and a starting address for the second set of logical addresses, and a quantity of the second set of logical addresses.

8. The method of claim 7, further comprising:
    determining, by the memory system, the first set of logical addresses based at least in part on the starting logical address for the first set of logical addresses and the quantity of the first set of logical addresses; and
    determining, by the memory system, the second set of logical addresses based at least in part on the starting logical address for the first set of logical addresses, the difference, and the quantity of the second set of logical addresses.

9. The method of claim 1, wherein the first set of logical addresses is contiguous, the second set of logical addresses is contiguous, and the write command indicates that the first set of logical addresses is discontiguous with the second set of logical addresses.

10. The method of claim 1, further comprising:
    determining, by the memory system based at least in part on a failure event, a storage status of the sequence of data based at least in part on the first metadata and the second metadata.

11. The method of claim 10, further comprising:
    discarding, by the memory system, a subset of the sequence of data based at least in part on the storage status indicating that only the subset of the sequence of data has been written to the non-volatile memory.

12. The method of claim 1, wherein the first metadata is written to a same first set of pages as the first data, and wherein the second metadata is written to a same second set of pages page as the second data.

13. The method of claim 1, further comprising:
determining, by the memory system based at least in part on the write command, whether the second data is a last set of data included in the sequence of data, wherein the second metadata comprises an indication that the second data is the last set of data.

14. A method, comprising:
transmitting, by a host system, a command for a memory system to enter a mode for receiving a sequence of data;
transmitting, by the host system based at least in part on transmitting the command, a write command for a set of data included in the sequence of data, the write command comprising an identifier equal to a value associated with the mode;
writing, by the memory system to a non-volatile memory, the set of data based at least in part on the write command; and
writing, by the memory system to the non-volatile memory, metadata for the set of data based at least in part on the identifier of the write command being equal to the value associated with the mode, wherein the metadata indicates that the set of data is included in the sequence of data.

15. The method of claim 14, further comprising:
determining whether the set of data is included in the sequence of data based at least in part on the identifier being equal to the value associated with the mode.

16. The method of claim 14, further comprising:
determining, by the memory system based at least in part on a failure event, whether only a subset of the sequence of data has been written to the non-volatile memory based at least in part on the metadata; and
discarding, by the memory system, the subset of the sequence of data based at least in part on determining that only the subset has been written.

17. The method of claim 14, further comprising:
determining, by the memory system based at least in part on the write command, whether the set of data is a last set of data for the sequence of data, wherein the metadata comprises an indication that the set of data is the last set of data for the sequence of data.

18. The method of claim 14, further comprising:
determining, by the memory system, whether the set of data is a first set of data for the sequence of data, wherein the metadata comprises an indication that the set of data is the first set of data for the sequence of data.

19. The method of claim 14, further comprising:
receiving, from the host system after writing the set of data to the non-volatile memory, a second command to exit the mode for receiving the sequence of data, wherein the second command is received before receipt of a last write command for the sequence of data.

20. An apparatus, comprising:
one or more memory system controllers of a memory system that comprises one or more non-volatile memory devices; and
one or more host system controllers of a host system coupled with the memory system, wherein the one or more host system controllers is configured to cause the host system to:
receive a sequence of data comprising first data and second data from a same application of the host system;
transmit, based at least in part on the first data and the second data being from the same application, a write command that indicates a first set of logical addresses for the first data and a second set of logical addresses for the second data and that indicates the first data and the second data are included in the sequence of data; and wherein the one or more memory system controllers is configured to cause the memory system to:
write, to the one or more non-volatile memory devices, the first data and the second data based at least in part on receiving the write command; and
write, to the one or more non-volatile memory devices, first metadata for the first data and second metadata for the second data based at least in part on the write command indicating the first data and the second data are included in the sequence of data, wherein the first metadata indicates that the first data is included in the sequence of data and the second metadata indicates that the second data is included in the sequence of data.

* * * * *